US012585613B2

(12) United States Patent
Solomon

(10) Patent No.: US 12,585,613 B2
(45) Date of Patent: Mar. 24, 2026

(54) DETECTION OF AN ERROR CONDITION ON A SERIAL DATA BUS

(71) Applicant: MICROCHIP TECHNOLOGY INCORPORATED, Chandler, AZ (US)

(72) Inventor: Robin Jonah Solomon, Chennai (IN)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 14 days.

(21) Appl. No.: 18/410,615

(22) Filed: Jan. 11, 2024

(65) Prior Publication Data

US 2025/0103538 A1 Mar. 27, 2025

(30) Foreign Application Priority Data

Sep. 21, 2023 (IN) .............................. 202341063537

(51) Int. Cl.
*G06F 13/42* (2006.01)
*G06F 11/30* (2006.01)
(52) U.S. Cl.
CPC ...... *G06F 13/4282* (2013.01); *G06F 11/3027* (2013.01)
(58) Field of Classification Search
CPC .................................................. G06F 18/2178
See application file for complete search history.

(56) References Cited

U.S. PATENT DOCUMENTS 6,728,908 B1 * 4/2004 Fukuhara .............. H04L 1/0061
714/48

2005/0165989 A1 * 7/2005 Kim .................... G06F 13/4291
710/260
2009/0157931 A1 6/2009 Hayashita

OTHER PUBLICATIONS

"Specification for I3C", Mipi Alliance, Inc., Version 1.1.1, including Errata 01 and Errata 02, Mar. 2022, pp. 1-576.
"Management Component Transport Protocol (MCTP) 13C Transport Binding Specification", DMTF, 2021, pp. 1-33.
International Search Report & Written Opinion issued on Jan. 16, 2025 in corresponding International Application No. PCT/US2024/037983 (24 pages).
Microchip Technology Inc.: 1,2, 11, "PIC18F2455/2550/4455/4550 Data Sheet", Jan. 1, 2009 (Jan. 1, 2009), pp. 1-438, XP055877095, Retrieved from the Internet: retrieved on Jan. 10, 2022.

* cited by examiner

*Primary Examiner* — Henry Tsai
*Assistant Examiner* — Juanito C Borromeo
(74) *Attorney, Agent, or Firm* — Shumaker, Loop & Kendrick, LLP; Ryan M. Corbett

(57) ABSTRACT

A controller is provided that includes a serial data (SDA) line interface to connect the controller to an SDA line of a two-wire, shared, serial data bus. The controller includes a circuitry to provide output data for transfer on to the SDA line via the output SDA pad buffer. The controller includes a logic circuit that is external to the circuitry, and that monitors data on the SDA line while the output data is transferred on to the SDA line. The logic circuit compares the monitored data on the SDA line and the output data to detect an error condition when the monitored data and the output data differ. The logic circuit disables an output SDA pad buffer of the SDA line interface for a current byte of the output data provided by the circuitry, and then causes a stop condition on the data bus.

23 Claims, 7 Drawing Sheets

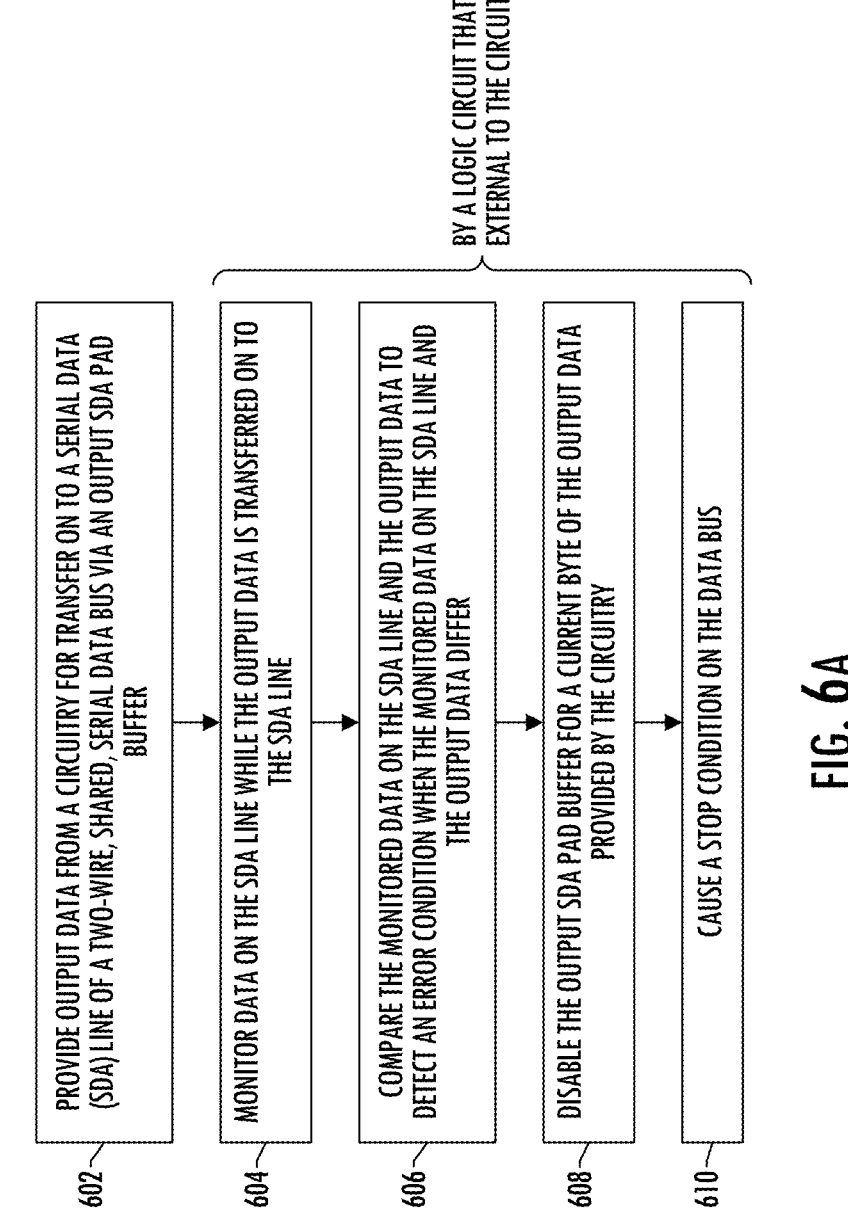

600

602 — PROVIDE OUTPUT DATA FROM A CIRCUITRY FOR TRANSFER ON TO A SERIAL DATA (SDA) LINE OF A TWO-WIRE, SHARED, SERIAL DATA BUS VIA AN OUTPUT SDA PAD BUFFER

604 — MONITOR DATA ON THE SDA LINE WHILE THE OUTPUT DATA IS TRANSFERRED ON TO THE SDA LINE

606 — COMPARE THE MONITORED DATA ON THE SDA LINE AND THE OUTPUT DATA TO DETECT AN ERROR CONDITION WHEN THE MONITORED DATA ON THE SDA LINE AND THE OUTPUT DATA DIFFER

608 — DISABLE THE OUTPUT SDA PAD BUFFER FOR A CURRENT BYTE OF THE OUTPUT DATA PROVIDED BY THE CIRCUITRY

610 — CAUSE A STOP CONDITION ON THE DATA BUS

BY A LOGIC CIRCUIT THAT IS EXTERNAL TO THE CIRCUITRY

FIG. 6A

612 — FILTER OUT NOISE IN THE DATA ON THE SDA LINE TO PRODUCE FILTERED DATA, THE MONITORED DATA BEING THE FILTERED DATA

614 — RECEIVE AN INDICATION THAT AN ADDRESS HEADER ON THE SDA LINE HAS BEEN TRANSMITTED

616 — MONITOR ONE OR MORE DATA WORDS THAT FOLLOW THE ADDRESS HEADER IN THE DATA ON THE SDA LINE

618 — PERFORM A BITWISE COMPARISON OF ONE OR MORE DATA WORDS OF THE MONITORED DATA ON THE SDA LINE, AND ONE OR MORE DATA WORDS OF THE OUTPUT DATA

620 — SET A FLAG TO INDICATE THE ERROR CONDITION IS DETECTED WHEN THE BITWISE COMPARISON INDICATES THE ONE OR MORE DATA WORDS OF THE MONITORED DATA ON THE SDA LINE AND THE ONE OR MORE DATA WORDS OF THE OUTPUT DATA DIFFER

FIG. 6D

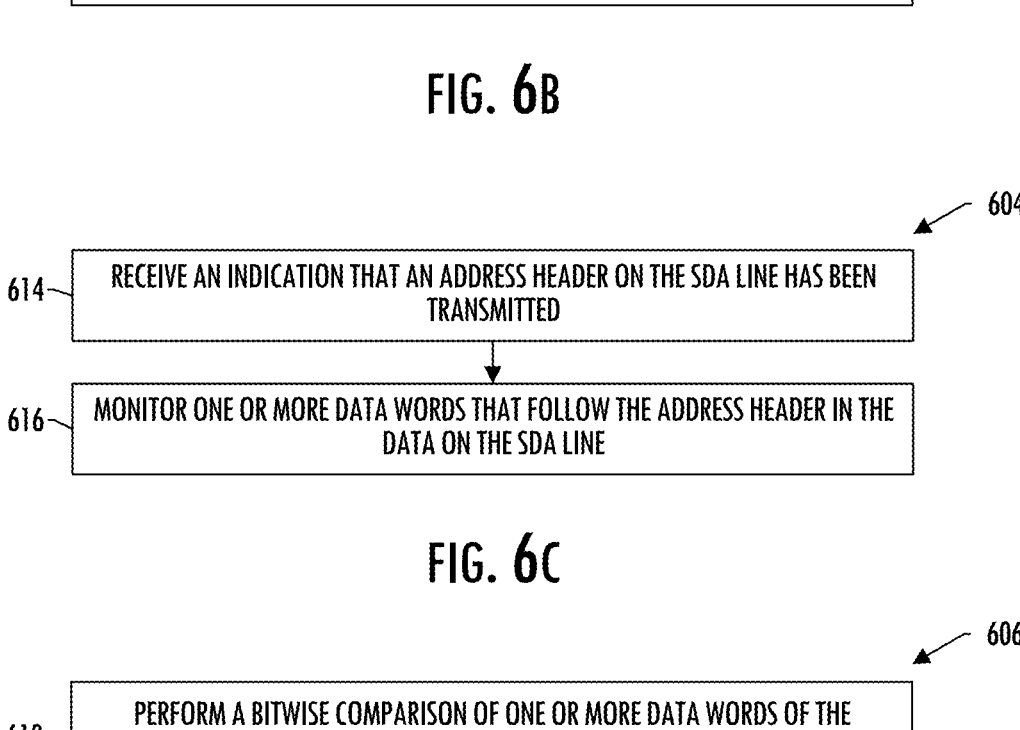

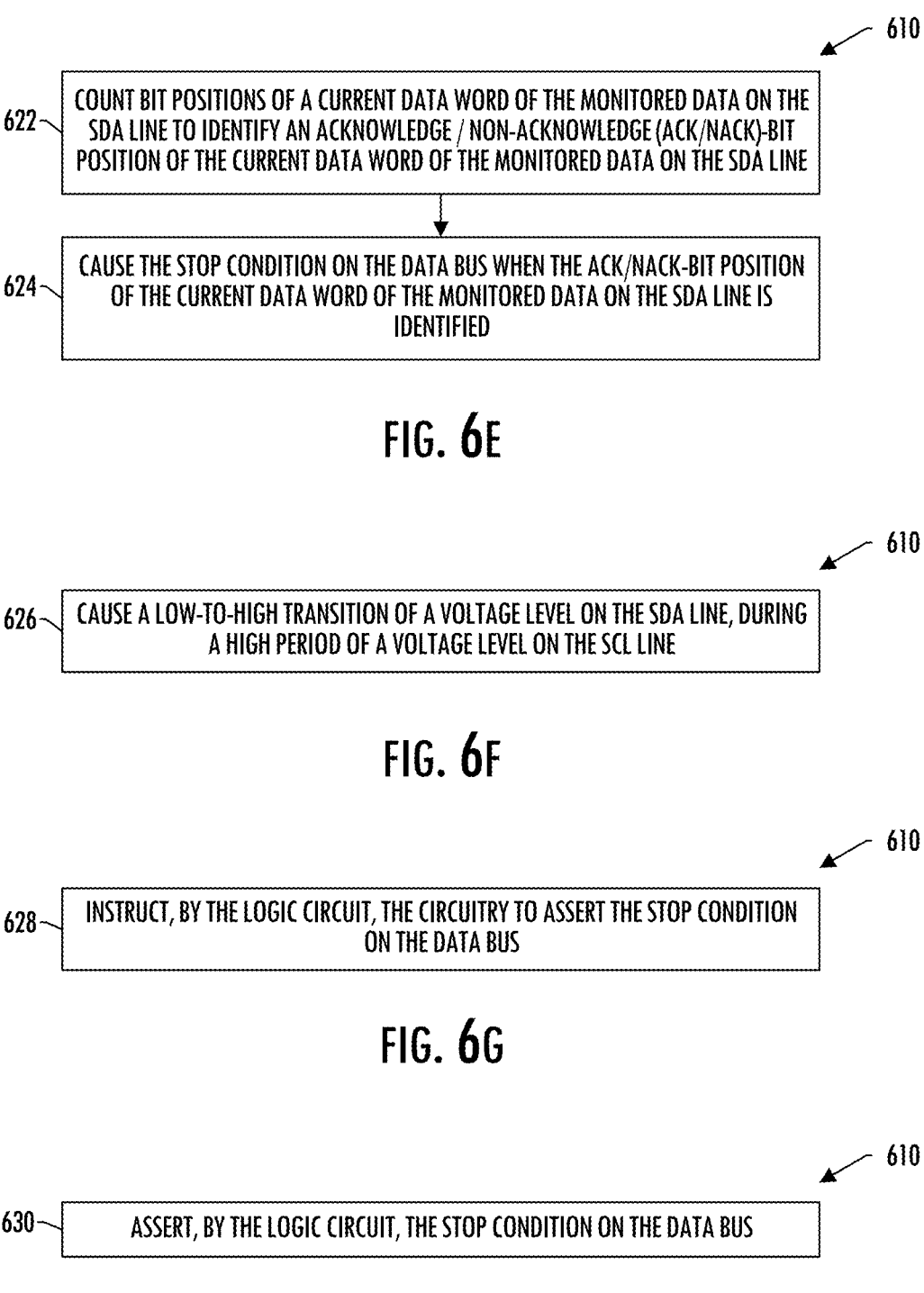

610

622 — COUNT BIT POSITIONS OF A CURRENT DATA WORD OF THE MONITORED DATA ON THE SDA LINE TO IDENTIFY AN ACKNOWLEDGE / NON-ACKNOWLEDGE (ACK/NACK)-BIT POSITION OF THE CURRENT DATA WORD OF THE MONITORED DATA ON THE SDA LINE

624 — CAUSE THE STOP CONDITION ON THE DATA BUS WHEN THE ACK/NACK-BIT POSITION OF THE CURRENT DATA WORD OF THE MONITORED DATA ON THE SDA LINE IS IDENTIFIED

626 — CAUSE A LOW-TO-HIGH TRANSITION OF A VOLTAGE LEVEL ON THE SDA LINE, DURING A HIGH PERIOD OF A VOLTAGE LEVEL ON THE SCL LINE

628 — INSTRUCT, BY THE LOGIC CIRCUIT, THE CIRCUITRY TO ASSERT THE STOP CONDITION ON THE DATA BUS

630 — ASSERT, BY THE LOGIC CIRCUIT, THE STOP CONDITION ON THE DATA BUS

FIG. 6H

DETECTION OF AN ERROR CONDITION ON A SERIAL DATA BUS

CROSS-REFERENCE TO RELATED APPLICATION(S)

The present application claims priority to Indian Provisional Patent Application No. 202341063537, entitled: Detection and Recovery from a Read-Write Data Conflict on a Serial Data Bus, filed on Sep. 21, 2023, the content of which is hereby incorporated by reference in its entirety.

TECHNOLOGICAL FIELD

The present disclosure relates generally to serial communication and, in particular, to detection of an error condition on a serial data bus.

BACKGROUND

Serial communication has played a significant role in facilitating inter-chip communication within electronic systems. It involves the transmission of data sequentially, bit by bit, over a communication link between devices. This approach offers advantages such as simplicity, low pin count, and the ability to transmit data over longer distances compared to parallel communication.

One popular serial communication protocol is I2C (Inter-Integrated Circuit), which was developed by Philips Semiconductor (now NXP Semiconductors) in the early 1980s. I2C is a two-wire bus protocol that allows multiple devices to communicate with each other using a shared serial data (SDA) line and serial clock (SCL) line. It supports a controller-target (master-slave) architecture where a controller device initiates and controls communication, and target devices respond to the controller's commands or requests. I2C is commonly used for connecting various devices in embedded systems, consumer electronics, and computer peripherals.

As technology advanced and the need for higher data transfer rates, increased flexibility, and improved power efficiency emerged, the MIPI Alliance developed I3C (Improved Inter-Integrated Circuit). Introduced in 2017, I3C builds upon the strengths of I2C while offering enhancements and additional features. I3C is backward compatible with I2C, allowing I2C devices to coexist on the same data bus. It introduces higher data transfer rates, increased flexibility for connecting multiple devices, multi-controller support, hot-join capability, dynamic address assignment, in-band interrupts, and other improvements. I3C has gained popularity in applications such as smartphones, tablets, Internet of Things (IoT) devices, and automotive systems.

Serial communication protocols like I2C and I3C have become integral to inter-chip communication within electronic systems. They enable devices to exchange data, commands, and control signals efficiently and reliably. These protocols have been widely adopted and standardized, allowing for interoperability between devices from different manufacturers and simplifying the integration of various components within electronic systems. The continued evolution and development of serial communication protocols contribute to the advancement of inter-chip communication and the seamless operation of modern electronic devices.

As serial communication protocols advance, it may occur that commercially available circuitry, such as a semiconductor intellectual property core (IP block), which may enable a controller to support serial communication on the serial data bus may not support certain errors.

BRIEF SUMMARY

In I3C, a controller may initiate a transaction with a target, such as a read transaction, a write transaction or receive an in-band interrupt (IBI); in some examples, however, an error type CE1 may occur. An error type CE1 may occur when the controller in a write state detects that input data on the data bus differs from what the controller intended to transfer as output data on the data bus. This may happen when the target misinterprets one or more information that indicates a read or write transaction, or an acknowledgement, during transactions (including an in-band interrupt initiated by the target approximately simultaneously with a private write transaction initiated by the controller). The target may act as if it is responding to a read transaction, when the controller actually intended to initiate a write transaction. When this occurs, the write data on the data bus from the controller might conflict with the read data from the target. In I3C, when the controller detects a CE1 error condition, the controller should stop the transmission, then assert a stop condition on the data bus and retry the transmission. However, present devices and circuitry that provide output data for transfer on to the SDA line do not properly support the CE1 error condition. Such circuitry may be implemented in a commercially available Intellectual Property block, which is difficult to change.

Example implementations of the present disclosure therefore relate to detection of a CE1 error condition, externally from circuitry, such as a semiconductor intellectual property core (IP block), which circuitry may enable a controller to support serial communication on the serial data bus. The present disclosure includes, without limitation, the following example implementations.

Some example implementations provide a controller comprising: a serial data (SDA) line interface to connect the controller to an SDA line of a two-wire, shared, serial data bus, the SDA line interface comprising an output SDA pad buffer; a circuitry to provide output data for transfer on to the SDA line via the output SDA pad buffer; and a logic circuit that is external to the circuitry, the logic circuit to at least: monitor data on the SDA line while the output data is transferred on to the SDA line; compare the monitored data on the SDA line and the output data to detect an error condition when the monitored data on the SDA line and the output data differ; and based on the detected error condition, disable the output SDA pad buffer for a current byte of the output data provided by the circuitry, and then cause a stop condition on the data bus.

Some example implementations provide a method comprising: providing output data from a circuitry for transfer on to a serial data (SDA) line of a two-wire, shared, serial data bus via an output SDA pad buffer; and by a logic circuit that is external to the circuitry, monitoring data on the SDA line while the output data is transferred on to the SDA line; comparing the monitored data on the SDA line and the output data to detect an error condition when the monitored data on the SDA line and the output data differ; and based on the detected error condition, disabling the output SDA pad buffer for a current byte of the output data provided by the circuitry, and then causing a stop condition on the data bus.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 6A, 6B, 6C, 6D, 6E, 6F, 6G and 6H are flowcharts illustrating various steps in a method, according to various example implementations.

DETAILED DESCRIPTION

Figure 1:
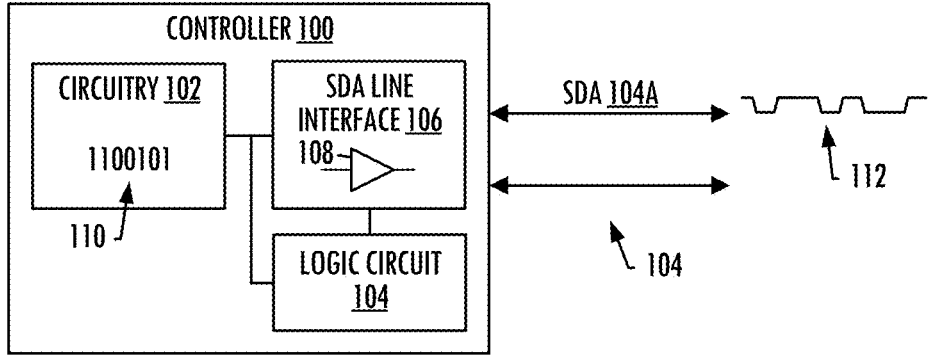
FIG. 1 illustrates a controller according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Further, reference may be made herein to terms specific to a particular system or architecture, but it should be understood that example implementations of the present disclosure may be equally applicable to any of a number of systems and architectures. In this regard, some example implementations may be described in the context of serial communication standards for inter-chip communication such as I3C and its predecessor, I2C. It should be understood, however, that example implementations may be equally applicable to other serial communication standards.

Example implementations of the present disclosure relate generally to serial communication and, in particular, to detection and recovery from read-write data conflict on a serial data bus.

FIG. 1 illustrates a controller 100 according to some example implementations of the present disclosure. The controller may be an electronic device, such as an integrated circuit (IC). As explained in greater detail below, the controller includes circuitry 102, and a logic circuit 104 that is external to the circuitry 102. The controller may also include one or more interfaces to connect the controller to a data bus 104 over which the controller may communicate with other electronic devices. In the context of serial communication standards such as I2C and I3C, the data bus may be a two-wire, shared, serial data bus 104. In this regard, the data bus may include a serial data (SDA) line 104A used for transmitting and receiving data between electronic devices connected to the data bus. The controller may include an SDA line interface 106 to connect the target to the SDA line, and the SDA line interface may include an output SDA pad buffer 108 to drive output data 110 on the SDA line.

Figure 2:
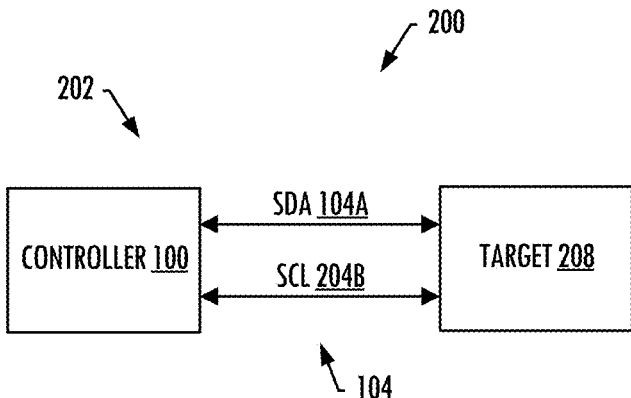
FIG. 2 illustrates a system including the controller of FIG. 1, according to some example implementations.

FIG. 2 illustrates a system 200 that includes the controller 100, according to some example implementations of the present disclosure. As shown, the system includes a number of electronic devices 202 such as ICs that are connected to the data bus 104. In addition to the SDA line 104A, the data bus may include a SCL line 204B that provides a clock signal used to synchronize data transfer between the electronic devices 202. In some examples, then, the controller 100 may also include a SCL line interface to connect the controller to the SCL line.

The system 200 may operate according to a controller-target architecture in which an electronic device 202 may function as the controller 100 that initiates and controls communication on the data bus 104 (timing and data), and another electronic device may function as a target 208 that responds to commands or requests from the controller. In some examples, the system may support multiple controllers and targets.

Figure 3:
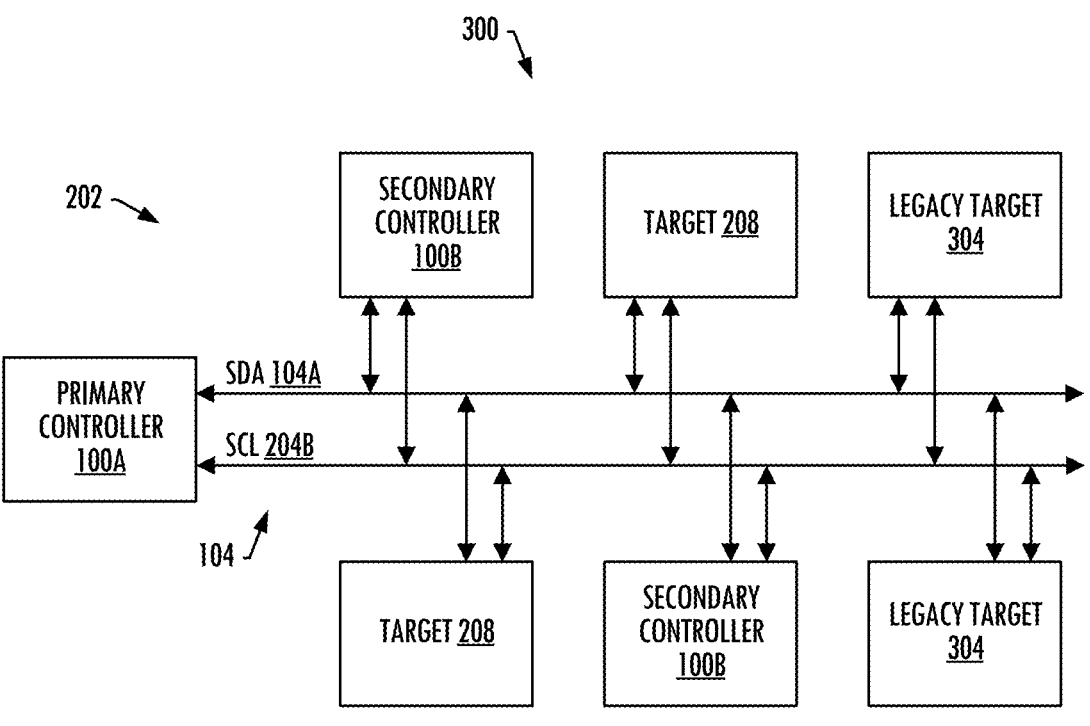
FIG. 3 illustrates a system that may correspond to the system of FIG. 2, including multiple controllers and targets, according to some example implementations.

FIG. 3 illustrates a system 300 that may correspond to the system 200 of FIG. 2, including multiple controllers and targets, according to some example implementations. As shown, for example, the system 300 may include a primary controller 100A and one or more secondary controllers 100B, any one of which may be an active controller that is currently in control of the data bus 104. The primary controller 100A may initialize the data bus and perform configuration of targets 208. The primary controller 100A may act as the authority for the data bus in its initial state, and become the first active controller once the data bus is configured. The secondary controller 100B may initially function as a target, but the secondary controller 100B can accept controller-ship from the primary controller 100A and become the new active controller. In the context of I3C, the system may include a I3C primary controller 100A and one or more I3C secondary controllers 100B.

The system 300 may likewise include one or more targets 208. The system may also include one or more legacy targets 304 from an earlier communication standard with which the system 300 may be compatible. Again, in the context of I3C, the system 300 may include one or more I3C targets 208, and the system may include one or more I2C targets 304.

Returning to FIG. 2, the system 200 may support multiple data transfer modes, allowing the electronic devices 202 to communicate at different speeds based on their capabilities. The modes may include a single data rate (SDR) mode and a number of high data rate (HDR) modes, with increasing data transfer rates and corresponding signal integrity requirements. The SDR mode in particular may be used for a number of purposes, such as to perform private messaging from the controller 100 to the target 208, and to enter other modes and states (e.g., HDR modes). In the context of I3C, the SDR mode may be used to implement built-in I3C features such as common command codes (CCCs), in-band interrupt (IBI), and hot-join. The SDR mode may also be used to transition from I2C to I3C through dynamic address assignment, as well as to perform legacy I2C transactions on the data bus 104.

The electronic devices 202 may operate in various output modes to drive signals on the data bus 104. Examples of suitable modes include an open-drain mode and a push-pull mode, which define how the electronic devices control the voltage levels on the SDA line 104A and the SCL line 204B. In open-drain mode, the electronic device may be configured at its output as an open drain or open collector. In the open-drain mode, the electronic device can pull the signal line (SDA or SCL) to a low voltage level (logic 0) by actively sinking current, but the electronic device 202 is not provided with an active element to pull the signal line to high voltage level (logic 1), instead a pull-up resistor, which may be external, may be used to pull the line to the high voltage level (logic 1). In push-pull mode, the electronic device may be configured at its output as a push-pull driver. In the push-pull mode, the electronic device can actively drive both high (logic 1) and low (logic 0) voltage levels on the signal line.

Figure 4A:
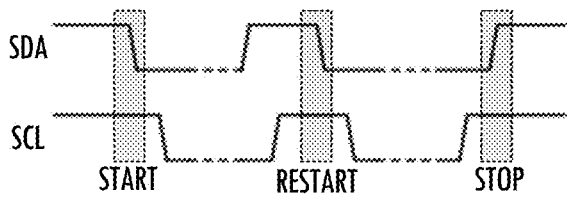
FIGS. 4A, 4B and 4C are timing diagrams of signals on lines of a data bus of the system of FIG. 2 or FIG. 3 for a transaction on the data bus, including to specify start, stop and restart conditions (FIG. 4A), an address header (FIG. 4B), and a data word (FIG. 4C), according to some example implementations.
Figure 4B:
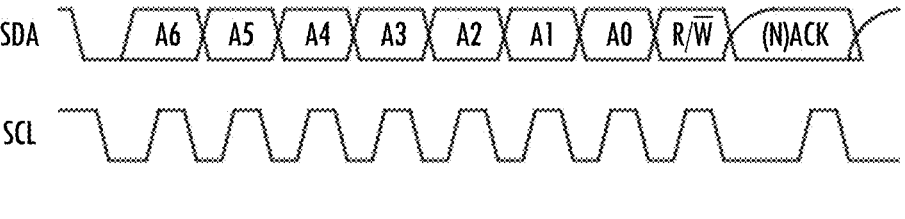
Figure 4C:
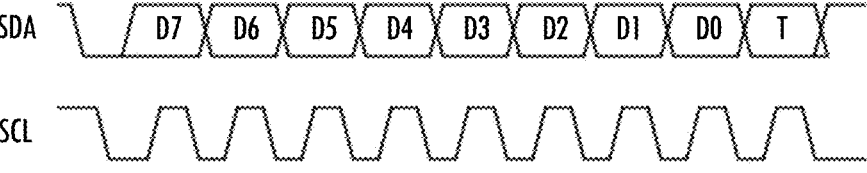

FIGS. 4A, 4B and 4C are timing diagrams of signals on the SDA line 104A and the SCL line 204B for a read/write transaction on the data bus 104, according to some example implementations. As shown in FIG. 4A, read/write transactions on the data bus may begin with a start condition, which may be asserted by the controller 100 and implemented as a high-to-low transition on the SDA line while the SCL line is maintained by the controller 100 at a constant high. Likewise, read/write transactions on the data bus may end with a stop condition asserted by the controller. A stop condition may be implemented as a low-to-high transition on the SDA line during a high period of a voltage level on the SCL line 204B. As an alternative to the stop condition, a restart condition may allow multiple messages to be sent while in the same frame without needing to transmit a stop and start in between messages. A restart condition may look the same as a start condition on the data bus.

Following a start/restart condition, a read/write transaction on the data bus 104 may include an address header, which may include a destination address, indicate a read or write transaction, and provide an acknowledgement. The address header may be transmitted on the SDA line 104A during periods when the SCL line 204B is transitioning from low to high (rising edge) or from high to low (falling edge). FIG. 4B is a timing diagram of the SDA line and the SCL line for an address header, according to some example implementations. In the context of I2C and I3C, the address header may include seven address bits, one read/write (R/W) bit, and one acknowledge (ACK)/non-acknowledge (NACK) bit. In the context of I3C, the R/W bit may be referred to as a R/W bit or a RnW bit. In some examples, the controller 100 may transmit the address and R/W bits. The controller 100 may use the address bits to address the target 208, and the controller may use the R/W bit to specify a write mode (the controller 100 writing data to the target 208) or a read mode (the controller 100 reading data from the target 208). In this regard, the controller 100 may transmit a low signal on the SDA line 104A (R/W bit=0) to represent the write mode, or a high signal on SDA line (R/W bit=1) to represent the read mode.

Once the controller 100 transmits the address and R/W bits of the address header on the data bus 104, the controller may wait for the target 208 to acknowledge (or not acknowledge) the request. This may be done through the ACK/NACK bit in the address header. The target may pull the SDA line 104A low (ACK/NACK bit=0) to respond with an acknowledge (ACK), or release the SDA line high (ACK/NACK bit=1) to respond with a non-acknowledge (NACK).

One or more data words may follow the address header, as shown in FIG. 4C (in push/pull mode). Similar to the address header, the data words may be transmitted on the SDA line 104A during periods when the SCL line 204B is transitioning from low to high (rising edge) or from high to low (falling edge). In the context of I3C, a data word may be nine bits wide, including eight-bit data and a ninth, transition bit (T-bit). When the controller 100 is writing data to the target 208, the T-bit of each data word may be a parity bit calculated using odd parity, which is helpful in detecting noise-caused errors on the data bus. Conversely, when the controller 100 is reading data returned from the target, the T-bit of each data word may represent an end-of-data bit. In this regard, the target 208 may use the T-bit to control the number of data words the target returns. The T-bit may also let the controller 100 prematurely abort the read. To end the message, the target 208 may return the T-Bit as '0'. To continue the message, the target may return the T-Bit as '1' and monitor the SDA line. If the SDA line remains high on the next falling SCL edge, the target may continue to send the next data value. If the SDA line is low on the next falling SCL edge (restart), then the controller 100 has aborted the data transfer, and the target 208 does not send the next data.

The electronic devices 202 may implement one or more error detection and recovery methods to handle various error conditions during read/write transactions on the data bus

104. In this regard, in the context of I3C, if an error occurs in the R/W bit of the address header, the target 208 might act as it is responding to a read transaction, when the controller 100 actually attempted to initiate a write transaction. When this occurs, the write data on the data bus from the controller might conflict with the read data from the target. In the MIPI 130'R Specification, published by the Mobile Industry Processor Interface (MIPI) Alliance, this error condition is referred to as error type CE1 when detected by the controller. As specified, the controller 100 should monitor the SDA line 104A of the data bus 104 when the controller 100 transmits on the SDA line 104A of the data bus 104 for write transactions, which allows the controller to detect a CE1 error condition when the monitored data differs from the data the controller attempted to transmit.

According to MIPI 130'R Specification, when the controller 100 detects a CE1 error condition during an attempted private write transaction with the target 208 (i.e., when the target 208 acts as it is responding to a private read transaction, while the controller 100 has attempted to perform a private write transaction), the controller 100 may stop the transmission, and then assert a stop condition on the SDA line 104A and retry the transmission. Example implementations of the present disclosure provide a logic circuit to detect such a CE1 error, and take action so as to avoid having prolonged conflicting data on the data bus 104, so as to reduce power consumption, and avoid potential damage.

According to some example implementations of the present disclosure, the controller 100 may operate in a write state to execute a write transaction to transfer output data 110 on to the data bus 104. When the controller is in the write state, the controller may monitor data 112 on the SDA line 104A, compare the data 112 on the SDA line 104A and the output data 110, and detect an error condition when the data 112 on the SDA line 104A and the output data 110 differ. Then, based on the error condition, the controller may disable the internal, output SDA pad buffer 108 that drives the output data 110 on the SDA line 104A, until transfer of a current byte of the data 112 on the SDA line 104A is complete. The controller may then assert a stop condition on the SDA line 104A of the data bus 104.

As shown in FIG. 1, for example, the circuitry 102 that is to provide output data 110 for transfer on to the SDA line 104A transmits the data 112 via the output SDA pad buffer 108. The logic circuit 104 may monitor data 112 on the SDA line 104A while the output data 110 is transferred on to the SDA line 104A. The logic circuit 104 may compare the monitored data 112 on the SDA line 104A and the output data 110 to detect an error condition (e.g., a CE1 error condition) when the monitored data 112 on the SDA line 104A and the output data 110 differ. Based on the detected error condition, the logic circuit 104 may disable the output SDA pad buffer 108 for a current byte of the output data 110 provided by the circuitry 102, and then cause a stop condition on the data bus.

Figure 5:
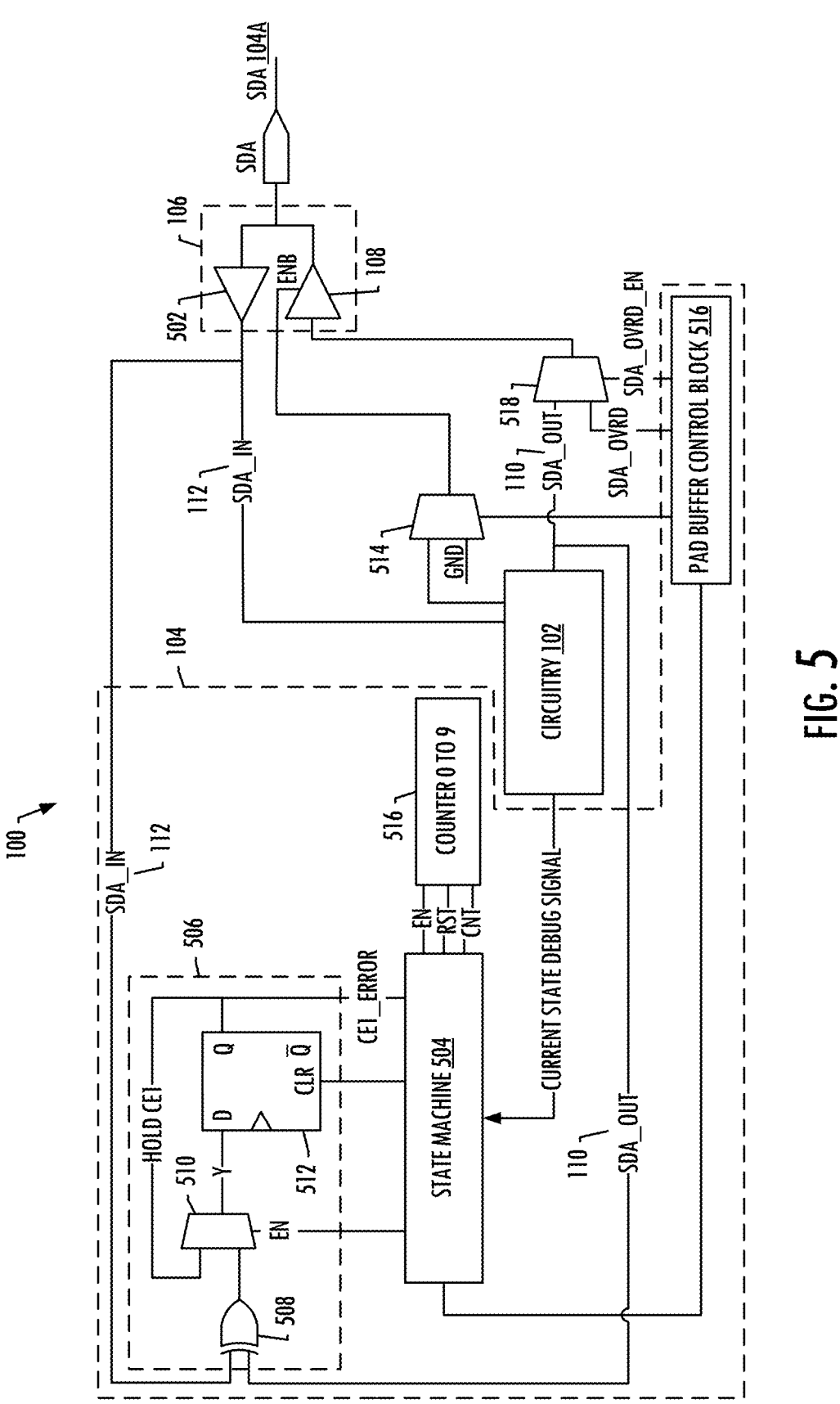
FIG. 5 is a functional block diagram of a controller of FIG. 1, according to some example implementations.

To further illustrate some example implementations of the present disclosure, FIG. 5 is a block diagram of the controller 100, according to some example implementations. As shown, the controller 100 includes circuitry 102, such as a semiconductor intellectual property core (IP block), which may enable the controller 100 to support serial communication on the data bus 104. In this regard, the circuitry 102 may provide the output data 110 (SDA_OUT) for transfer on to the SDA line 104A via the output SDA pad buffer 108 of the SDA line interface 106. In some examples, the output SDA pad buffer 108 may be a three-state buffer, and the circuitry 102 may enable the output SDA pad buffer to drive the output data 110, such as when the controller 100 is in the write state. Circuity 102 may be provided without support for the CE1 error.

In some examples, the SDA line interface 106 also includes an input SDA pad buffer 502 to receive the monitored data 112 (SDA_IN) on the SDA line 104A. The input SDA pad buffer may filter out noise in the monitored data 112 on the SDA line 104A to produce filtered data. More particularly, for example, the input SDA pad buffer 502 may include a glitch filter (sometimes referred to as a spike filter) to filter out unwanted noise in the monitored data 112, such as by suppressing extreme changes in the voltage level on the SDA line. The monitored data, then, may be the filtered data.

As also shown, the logic circuit 104 of the controller 100 may include a state machine 504 and a detector 506 to monitor the data 112 on the SDA line 104A. In this regard, the state machine 504 may receive an indication from the circuitry 102 that the address header on the SDA line 104A has been transmitted, which indication may transmitted by the circuitry 102, or read by the state machine 504 from the circuitry 102, as part of a debugging signal or port of the circuitry 102, and enable the detector 506 to monitor one or more data words that follow the address header in the data 112 on the SDA line 104A.

The detector 506 may include a logic gate, such as an XOR (exclusive or) gate 508. The logic gate may perform a bitwise comparison of one or more data words of the monitored data 112 on the SDA line 104A, and one or more data words of the output data 110 as transmitted by circuitry 102 on line SDA_OUT. The detector 506 may also include one or more sequential logic elements, such as a multiplexer 510 and a D flip-flop 512. The one or more sequential logic elements may set a flag to indicate the error condition is detected when the bitwise comparison indicates the one or more data words of the monitored data 112 on the SDA line 104A and the one or more data words of the output data 110 differ.

In some more specific examples, the XOR gate 508 may produce a high gate output (logic 1) when the one or more data words of the monitored data 112 on the SDA line 104A and the one or more data words of the output data 110 differ, which output of the XOR gate 508 is fed to a first input of the multiplexer 510. The multiplexer 510, responsive to an asserted enable signal (EN) from the state machine 504, may pass the output of XOR gate 508 to the D input of D flip-flop 512, which D flip-flop 512 is clocked by a signal which may be the SCL clock, a synchronized SCL clock, or a faster clock signal, and the D flip-flop may then latch the output of XOR gate 508.

In the event that the one or more data words of the monitored data 112 on the SDA line 104A and the one or more data words of the output data 110 differ, the D flip-flop 512 will thus latch the high output as a flag (referred to at times as a CE1 error flag), which may be expressed as a CE1_ERROR signal provided to the state machine 504 to indicate a CE1 condition is encountered. Responsive to the set CE1 error flag, i.e., an active CE1_ERROR signal, the state machine 504 may de-assert the enable signal to multiplexer 510, thereby latching in the CE1 error flag, which is fed back to a second input of the multiplexer 510. In other examples, multiplexer 510 and D flip-flop 512 are not required, and the state machine 504 responds to the CE1 error flag without requiring that the CE1 error flag be latched. Similarly, the state machine 504 may clear the D flip-flop 512 and thereby the clear the CE1 error flag when the detector 506 is not in use or the controller exits the write state.

In some examples, the logic circuit 104 may disable the output SDA pad buffer 108 when the CE1 error flag is set. In some examples in which the output SDA pad buffer 108 is a three-state buffer, the logic circuit 104 may disable the output SDA pad buffer 108 via an enable/disable input (ENB) of the three-state buffer.

In some examples, the controller 100 includes a 2:1 multiplexer 514, and the logic circuit 104 includes a pad buffer control block 516. The 2:1 multiplexer 514 may include an output line coupled to the enable/disable input of the output SDA pad buffer 108, and a first input line coupled to a respective output of the circuitry 102 to allow the circuitry 102 to enable the output SDA pad buffer when the controller is in the write state, or when the circuitry 102 is sending instructions or an address on the SDA line 104A.

The 2:1 multiplexer 514 may also include a second input line coupled to ground (logic 0), and a select line coupled to the pad buffer control block 516 to allow the pad buffer control block to select one of the first or second input lines of the 2:1 multiplexer 514. The pad buffer control block 516 may select the first input line to allow the circuitry 102 to control the output SDA pad buffer 108, such as to enable the SDA pad buffer 108 in the write state. When the state machine 504 detects the CE1 error flag, however, the state machine 504 may control the pad buffer control block to select the second input line of the 2:1 multiplexer, and thereby connect the enable/disable input of the output SDA pad buffer to ground to disable the output SDA pad buffer. The state machine 504 and detector 506 may therefore detect the CE1 error condition and perform operations based on the error condition, external to and without disruption to the circuitry 102 (e.g., IP block).

Regardless of the exact manner by which the logic circuit 104 disables the output SDA pad buffer 108, in one example, the logic circuit 104 may then cause a stop condition on the data bus 104, such as to cause a target 208 to end transfer of the monitored data 112 on the SDA line 104A. In particular, the state machine 504 of the logic circuit 104 may cause the stop condition on the data bus to cause the target 208 to end transfer of the monitored data 112 on the SDA line 104A.

In some examples, the logic circuit 104 may include a counter block 516, which the state machine 504 may use to count bit positions of a current data word of the monitored data 112 on the SDA line 104A. The state machine may thereby identify an ACK/NACK-bit position of the current data word of the monitored data 112 on the SDA line 104A. The state machine may then cause the stop condition on the data bus when the ACK/NACK-bit position of the current data word of the monitored data 112 on the SDA line 104A is identified. In some examples, the state machine may cause a low-to-high transition of a voltage level on the SDA line 104A, during a high period of a voltage level on the SCL line 204B.

The logic circuit 104 may cause the stop condition on the data bus 104 in any of a number of different manners. In some examples, the logic circuit may instruct the circuitry 102 to assert the stop condition on the data bus 104. In particular, for example, the state machine 504 may use a test SCL and SDA test override to cause the circuitry 102 to assert the stop condition.

In some examples, the logic circuit may assert the stop condition on the data bus 104. In some of these examples, the controller 100 includes a second 2:1 multiplexer 518, and the second 2:1 multiplexer 518 may include an input line coupled to the SDA_OUT line of the circuitry 102, and an output line coupled to the output SDA pad buffer 108 to allow the circuitry 102 to provide the output data 110 for transfer on to the SDA line 104A via the output SDA pad buffer 108.

The second 2:1 multiplexer 518 may also include a second input line (SDA_OVRD), and a select line (SDA_OVRD_EN) coupled to respective outputs of the pad buffer control block 516. The select line may allow the pad buffer control block 516 to select one of the first or second input lines of the second 2:1 multiplexer 518. The pad buffer control block 516 may select the first input line to allow the circuitry 102 to provide data to the output SDA pad buffer 108, such as to drive data to the SDA pad buffer 108 in the write state. When the CE1 error flag is detected, the state machine 504 may control the pad buffer control block 516 to select the second input line of the second 2:1 multiplexer 518, and thereby connect the second input line of the second 2:1 multiplexer to the output SDA pad buffer 108. The second 2:1 multiplexer 518 may provide an override signal on the second input line of the second 2:1 multiplexer to cause a low-to-high transition of the voltage level on the SDA line 104A, during a high period of a voltage level on the SCL line 204B, and thereby assert a stop condition on the data bus 104.

Subsequent to causing the stop condition, synchronously with causing the stop condition, or immediately before causing the stop condition, the state machine 504 may assert the enable signal to the multiplexer 510, clear the D flip-flop 512, and signal the pad buffer control block 516 to again select the first input of the 2:1 multiplexer 514 to again allow the circuitry 102 to enable the output SDA pad buffer 108.

FIGS. 6A-6H are flowcharts illustrating various steps in a method 600 according to various example implementations. The method includes providing output data from a circuitry for transfer on to a serial data (SDA) line of a two-wire, shared, serial data bus via an output SDA pad buffer, as shown at block 602 of FIG. 6A. Then by a logic circuit that is external to the circuitry, the method includes monitoring data on the SDA line while the output data is transferred on to the SDA line, as shown at block 604. The method includes comparing the monitored data on the SDA line and the output data to detect an error condition when the monitored data on the SDA line and the output data differ, as shown at block 606. Based on the detected error condition, the method includes disabling the output SDA pad buffer for a current byte of the output data provided by the circuitry, and then causing a stop condition on the data bus, as shown at blocks 608 and 610.

In some examples, the method 600 includes filtering out noise in the data on the SDA line to produce filtered data, as shown at block 612 of FIG. 6B. In some of these examples, the monitored data is the filtered data.

In some examples, monitoring the data on the SDA line at block 604 includes receiving an indication that an address header on the SDA line has been transmitted, as shown at block 614 of FIG. 6C. In some of these examples, monitoring the data on the SDA line also includes monitoring one or more data words that follow the address header in the data on the SDA line, as shown at block 616.

In some examples, comparing the monitored data on the SDA line and the output data at block 606 includes performing a bitwise comparison of one or more data words of the monitored data on the SDA line, and one or more data words of the output data, i.e., the one or more data words output by the circuitry 102, as shown at block 618 of FIG. 6D. A flag is set to indicate the error condition is detected when the bitwise comparison indicates the one or more data words of the monitored data on the SDA line and the one or more data words of the output data differ, as shown at block 620. In some of these examples, when the flag is set, the output SDA pad buffer is disabled at block 608, and then the stop condition is caused at block 610.

In some examples, the output SDA pad buffer is a three-state buffer with an enable/disable input via which the output SDA pad buffer is disabled at block 608.

In some examples, the stop condition on the data bus is caused at block 610 to cause a target to end transfer of the monitored data on the SDA line.

In some examples, causing the stop condition at block 610 includes counting bit positions of a current data word of the monitored data on the SDA line to identify an acknowledge/ non-acknowledge (ACK/NACK)-bit position of the current data word of the monitored data on the SDA line, as shown at block 622 of FIG. 6E. In some of these examples, the stop condition on the data bus is caused when the ACK/NACK-bit position of the current data word of the monitored data on the SDA line is identified, as shown at block 624.

In some examples, the data bus includes the SDA line and a serial clock (SCL) line. In some of these examples, causing the stop condition on the data bus at block 610 includes causing a low-to-high transition of a voltage level on the SDA line, during a high period of a voltage level on the SCL line, as shown at block 626 of FIG. 6F.

In some examples, causing the stop condition on the data bus at block 610 includes instructing, by the logic circuit, the circuitry to assert the stop condition on the data bus, as shown at block 628 of FIG. 6G.

In some examples, causing the stop condition on the data bus at block 610 includes causing the stop condition on the data bus comprises asserting, by the logic circuit, the stop condition on the data bus, as shown at block 630 of FIG. 6H.

As explained above and reiterated below, the present disclosure includes, without limitation, the following example implementations.

Clause 1. A controller comprising: a serial data (SDA) line interface to connect the controller to an SDA line of a two-wire, shared, serial data bus, the SDA line interface comprising an output SDA pad buffer; a circuitry to provide output data for transfer on to the SDA line via the output SDA pad buffer; and a logic circuit that is external to the circuitry, the logic circuit to at least: monitor data on the SDA line while the output data is transferred on to the SDA line; compare the monitored data on the SDA line and the output data to detect an error condition when the monitored data on the SDA line and the output data differ; and based on the detected error condition, disable the output SDA pad buffer for a current byte of the output data provided by the circuitry, and then cause a stop condition on the data bus.

Clause 2. The controller of clause 1, wherein the SDA line interface comprises an input SDA pad buffer to receive the monitored data on the SDA line, the input SDA pad buffer is to filter out noise in the monitored data on the SDA line to produce filtered data, and the monitored data is the filtered data.

Clause 3. The controller of clause 1 or clause 2, wherein the logic circuit comprises a state machine and a detector to monitor the data on the SDA line, the state machine to at least: receive an indication that an address header on the SDA line has been transmitted; and enable the detector to monitor one or more data words that follow the address header in the data on the SDA line.

Clause 4. The controller of any of clauses 1 to 3, wherein the logic circuit comprises a detector to compare the monitored data on the SDA line and the output data, the detector comprising: a logic gate to perform a bitwise comparison of one or more data words of the monitored data on the SDA line, and one or more data words of the output data; and one or more sequential logic elements to set a flag to indicate the error condition is detected when the bitwise comparison indicates the one or more data words of the monitored data on the SDA line and the one or more data words of the output data differ, and wherein, when the flag is set, the logic circuit is to disable the output SDA pad buffer, and then cause the stop condition.

Clause 5. The controller of any of clauses 1 to 4, wherein the output SDA pad buffer is a three-state buffer with an enable/disable input via which the logic circuit is to disable the output SDA pad buffer.

Clause 6. The controller of any of clauses 1 to 5, wherein the logic circuit is to cause the stop condition on the data bus to cause a target to end transfer of the data on the SDA line.

Clause 7. The controller of any of clauses 1 to 6, wherein the logic circuit to cause the stop condition comprises the logic circuit to: count bit positions of a current data word of the monitored data on the SDA line to identify an acknowledge/non-acknowledge (ACK/NACK)-bit position of the current data word of the monitored data on the SDA line; and cause the stop condition on the data bus when the ACK/NACK-bit position of the current data word of the monitored data on the SDA line is identified.

Clause 8. The controller of any of clauses 1 to 7, wherein the data bus includes the SDA line and a serial clock (SCL) line; and wherein the logic circuit to cause the stop condition on the data bus comprises the logic circuit to cause a low-to-high transition of a voltage level on the SDA line, during a high period of a voltage level on the SCL line.

Clause 9. The controller of any of clauses 1 to 8, wherein the logic circuit to cause the stop condition on the data bus comprises the logic circuit to instruct the circuitry to assert the stop condition on the data bus.

Clause 10. The controller of any of clauses 1 to 9, wherein the logic circuit to cause the stop condition on the data bus comprises the logic circuit to assert the stop condition on the data bus.

Clause 11. A method comprising: providing output data from a circuitry for transfer on to a serial data (SDA) line of a two-wire, shared, serial data bus via an output SDA pad buffer; and by a logic circuit that is external to the circuitry, monitoring data on the SDA line while the output data is transferred on to the SDA line; comparing the monitored data on the SDA line and the output data to detect an error condition when the monitored data on the SDA line and the output data differ; and based on the detected error condition, disabling the output SDA pad buffer for a current byte of the output data provided by the circuitry, and then causing a stop condition on the data bus.

Clause 12. The method of clause 11, comprising filtering out noise in the data on the SDA line to produce filtered data, and wherein the monitored data is the filtered data.

Clause 13. The method of clause 11 or clause 12, wherein monitoring the data on the SDA line comprises: receiving an indication that an address header on the SDA line has been transmitted; and monitoring one or more data words that follow the address header in the data on the SDA line.

Clause 14. The method of any of clauses 11 to 13, wherein comparing the monitored data on the SDA line and the output data comprises: performing a bitwise comparison of one or more data words of the monitored data on the SDA line, and one or more data words of the output data; and setting a flag to indicate the error condition is detected when the bitwise comparison indicates the one or more data words of the monitored data on the SDA line and the one or more data words of the output data differ, and wherein, when the flag is set, the output SDA pad buffer is disabled, and then the stop condition is caused.

Clause 15. The method of any of clauses 11 to 14, wherein the output SDA pad buffer is a three-state buffer with an enable/disable input via which the output SDA pad buffer is disabled.

Clause 16. The method of any of clauses 11 to 15, wherein the stop condition on the data bus is caused to cause a target to end transfer of the monitored data on the SDA line.

Clause 17. The method of any of clauses 11 to 16, wherein causing the stop condition comprises: counting bit positions of a current data word of the monitored data on the SDA line to identify an acknowledge/non-acknowledge (ACK/NACK)-bit position of the current data word of the monitored data on the SDA line; and causing the stop condition on the data bus when the ACK/NACK-bit position of the current data word of the monitored data on the SDA line is identified.

Clause 18. The method of any of clauses 11 to 17, wherein the data bus includes the SDA line and a serial clock (SCL) line, and wherein causing the stop condition on the data bus comprises causing a low-to-high transition of a voltage level on the SDA line, during a high period of a voltage level on the SCL line.

Clause 19. The method of any of clauses 11 to 18, wherein causing the stop condition on the data bus comprises instructing, by the logic circuit, the circuitry to assert the stop condition on the data bus.

Clause 20. The method of any of clauses 11 to 19, wherein causing the stop condition on the data bus comprises asserting, by the logic circuit, the stop condition on the data bus.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:
1. A controller comprising:
a serial data (SDA) line interface to connect the controller to an SDA line of a two-wire, shared, serial data bus, the SDA line interface comprising an output SDA pad buffer;
a circuitry to provide output data for transfer on to the SDA line via the output SDA pad buffer, wherein the circuitry enables the controller to support serial communication on the serial data bus but fails to support detection of an error condition; and a logic circuit that is external to the circuitry, the logic circuit to at least:
monitor data on the SDA line while the output data is transferred on to the SDA line;
compare the monitored data on the SDA line and the output data to detect the error condition when the monitored data on the SDA line and the output data differ; and based on the detected error condition,
disable the output SDA pad buffer for a current byte of the output data provided by the circuitry, and then cause a stop condition on the data bus.

2. The controller of claim 1, wherein the SDA line interface comprises an input SDA pad buffer to receive the monitored data on the SDA line, the input SDA pad buffer is to filter out noise in the monitored data on the SDA line to produce filtered data, and the monitored data is the filtered data.

3. The controller of claim 1, wherein the logic circuit comprises a state machine and a detector to monitor the data on the SDA line, the state machine to at least:
receive an indication that an address header on the SDA line has been transmitted; and
enable the detector to monitor one or more data words that follow the address header in the data on the SDA line.

4. The controller of claim 1, wherein the logic circuit comprises a detector to compare the monitored data on the SDA line and the output data, the detector comprising:
a logic gate to perform a bitwise comparison of one or more data words of the monitored data on the SDA line, and one or more data words of the output data; and
one or more sequential logic elements to set a flag to indicate the error condition is detected when the bitwise comparison indicates the one or more data words of the monitored data on the SDA line and the one or more data words of the output data differ, and
wherein, when the flag is set, the logic circuit is to disable the output SDA pad buffer, and then cause the stop condition.

5. The controller of claim 1, wherein the output SDA pad buffer is a three-state buffer with an enable/disable input via which the logic circuit is to disable the output SDA pad buffer.

6. The controller of claim 1, wherein the logic circuit is to cause the stop condition on the data bus to cause a target to end transfer of the data on the SDA line.

7. The controller of claim 1, wherein the logic circuit to cause the stop condition comprises the logic circuit to:
count bit positions of a current data word of the monitored data on the SDA line to identify an acknowledge/non-acknowledge (ACK/NACK)-bit position of the current data word of the monitored data on the SDA line; and
cause the stop condition on the data bus when the ACK/NACK-bit position of the current data word of the monitored data on the SDA line is identified.

8. The controller of claim 1, wherein the data bus includes the SDA line and a serial clock (SCL) line; and
wherein the logic circuit to cause the stop condition on the data bus comprises the logic circuit to cause a low-to-high transition of a voltage level on the SDA line, during a high period of a voltage level on the SCL line.

9. The controller of claim 1, wherein the logic circuit to cause the stop condition on the data bus comprises the logic circuit to instruct the circuitry to assert the stop condition on the data bus.

10. The controller of claim 1, wherein the logic circuit to cause the stop condition on the data bus comprises the logic circuit to assert the stop condition on the data bus.

US 12,585,613 B2

15

11. A method comprising:

providing output data from a circuitry for transfer on to a serial data (SDA) line of a two-wire, shared, serial data bus via an output SDA pad buffer; and by a logic circuit that is external to the circuitry, monitoring data on the SDA line while the output data is transferred on to the SDA line;

comparing the monitored data on the SDA line and the output data to detect an error condition when the monitored data on the SDA line and the output data differ; and based on the detected error condition, disabling the output SDA pad buffer for a current byte of the output data provided by the circuitry, and then causing a stop condition on the data bus, wherein the circuitry enables the controller to support serial communication on the serial data bus but fails to support detection of an error condition.

12. The method of claim 11, comprising filtering out noise in the data on the SDA line to produce filtered data, and wherein the monitored data is the filtered data.

13. The method of claim 11, wherein monitoring the data on the SDA line comprises:

receiving an indication that an address header on the SDA line has been transmitted; and monitoring one or more data words that follow the address header in the data on the SDA line.

14. The method of claim 11, wherein comparing the monitored data on the SDA line and the output data comprises:

performing a bitwise comparison of one or more data words of the monitored data on the SDA line, and one or more data words of the output data; and setting a flag to indicate the error condition is detected when the bitwise comparison indicates the one or more data words of the monitored data on the SDA line and the one or more data words of the output data differ, and wherein, when the flag is set, the output SDA pad buffer is disabled, and then the stop condition is caused.

15. The method of claim 11, wherein the output SDA pad buffer is a three-state buffer with an enable/disable input via which the output SDA pad buffer is disabled.

16. The method of claim 11, wherein the stop condition on the data bus is caused to cause a target to end transfer of the monitored data on the SDA line.

17. The method of claim 11, wherein causing the stop condition comprises:

counting bit positions of a current data word of the monitored data on the SDA line to identify an acknowledge/non-acknowledge (ACK/NACK)-bit position of the current data word of the monitored data on the SDA line; and causing the stop condition on the data bus when the ACK/NACK-bit position of the current data word of the monitored data on the SDA line is identified.

18. The method of claim 11, wherein the data bus includes the SDA line and a serial clock (SCL) line, and wherein causing the stop condition on the data bus comprises causing a low-to-high transition of a voltage level on the SDA line, during a high period of a voltage level on the SCL line.

19. The method of claim 11, wherein causing the stop condition on the data bus comprises instructing, by the logic circuit, the circuitry to assert the stop condition on the data bus.

20. The method of claim 11, wherein causing the stop condition on the data bus comprises asserting, by the logic circuit, the stop condition on the data bus.

21. The controller of claim 1, wherein the circuitry is a semiconductor intellectual property core external to the logic circuit, wherein the logic circuit is configured according to I3C, and wherein the error condition is an I3C CE1 error condition.

22. The controller of claim 3, wherein the detector is enabled to monitor one or more data words nine bits wide, comprising an eight-bit data and a ninth transition-bit.

23. The controller of claim 3, wherein the one or more data words include a transition bit that allows the logic circuit to disable the output SDA pad buffer.

* * * * *